Figure 1:
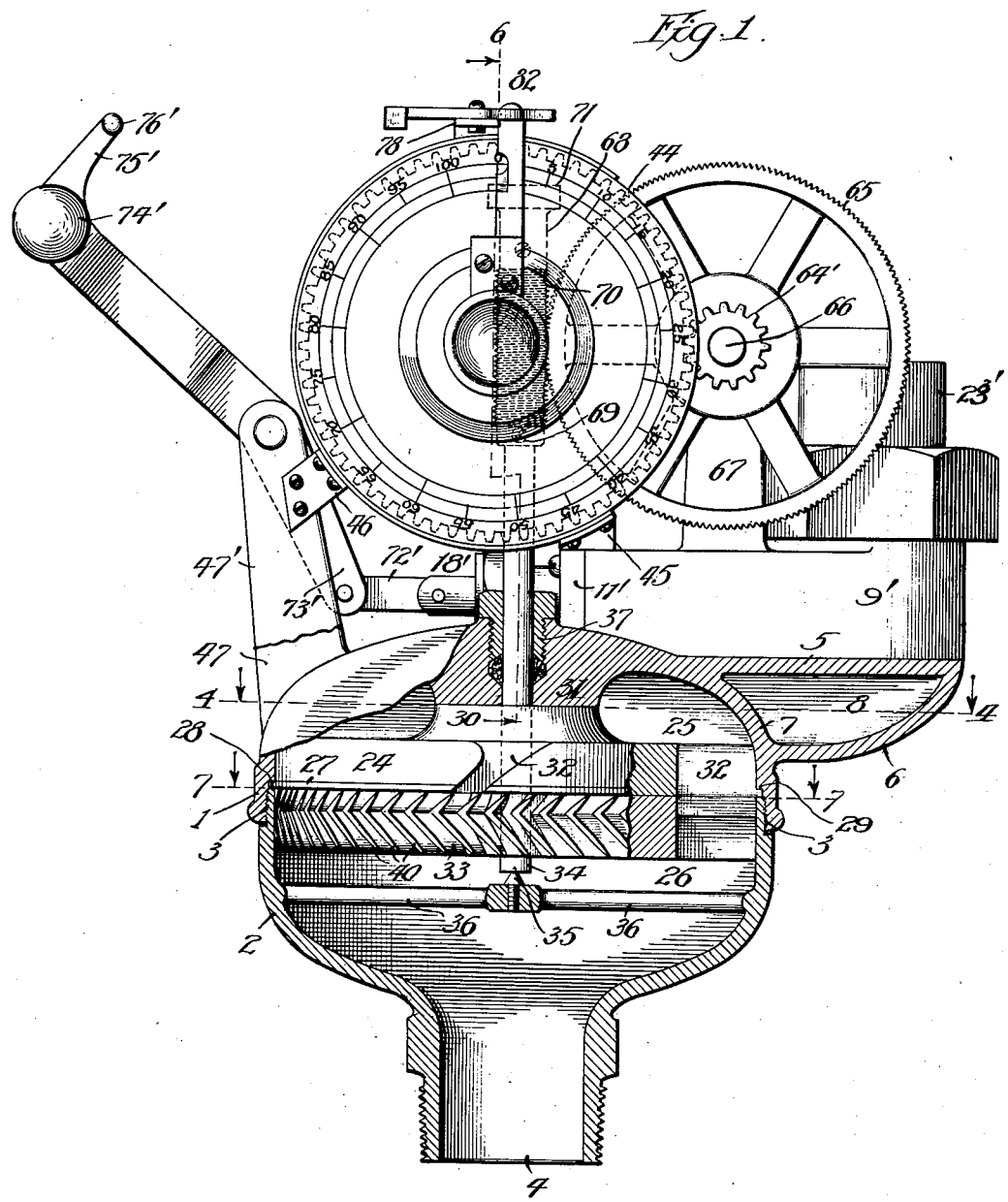

A. L. HANSEN.
FLUID METER.
APPLICATION FILED JUNE 2, 1910.

998,089.

Patented July 18, 1911.
4 SHEETS—SHEET 1.

A. L. HANSEN.
FLUID METER.
APPLICATION FILED JUNE 2, 1910.
998,089.
Patented July 18, 1911.
4 SHEETS—SHEET 2.
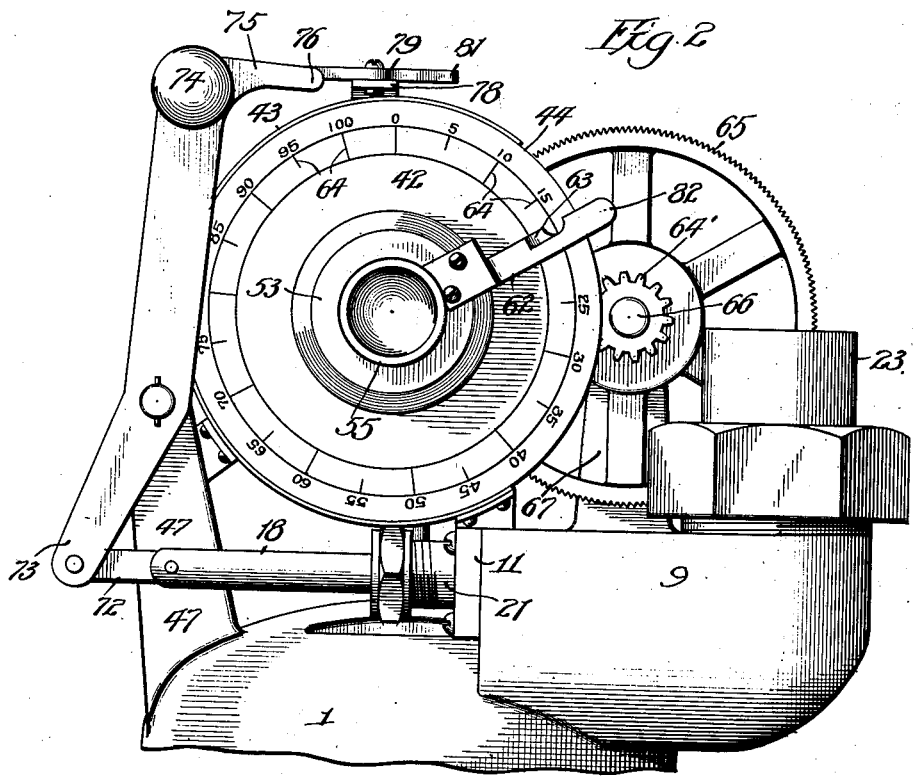
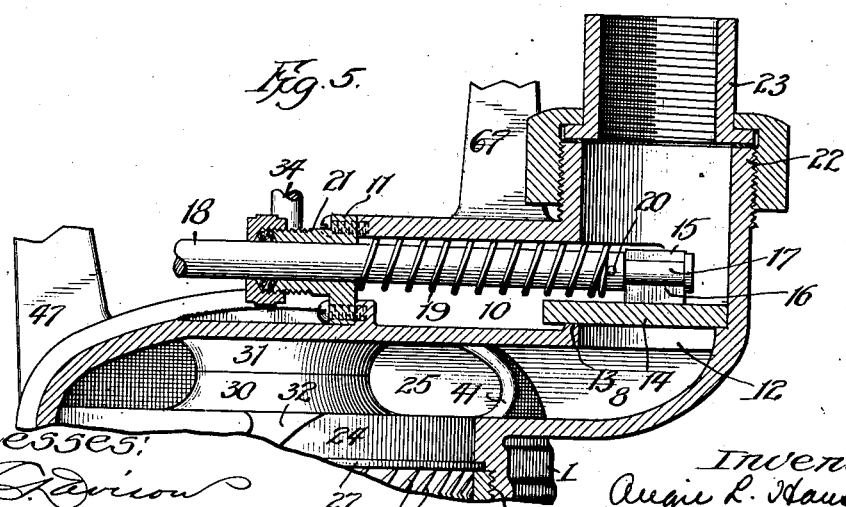

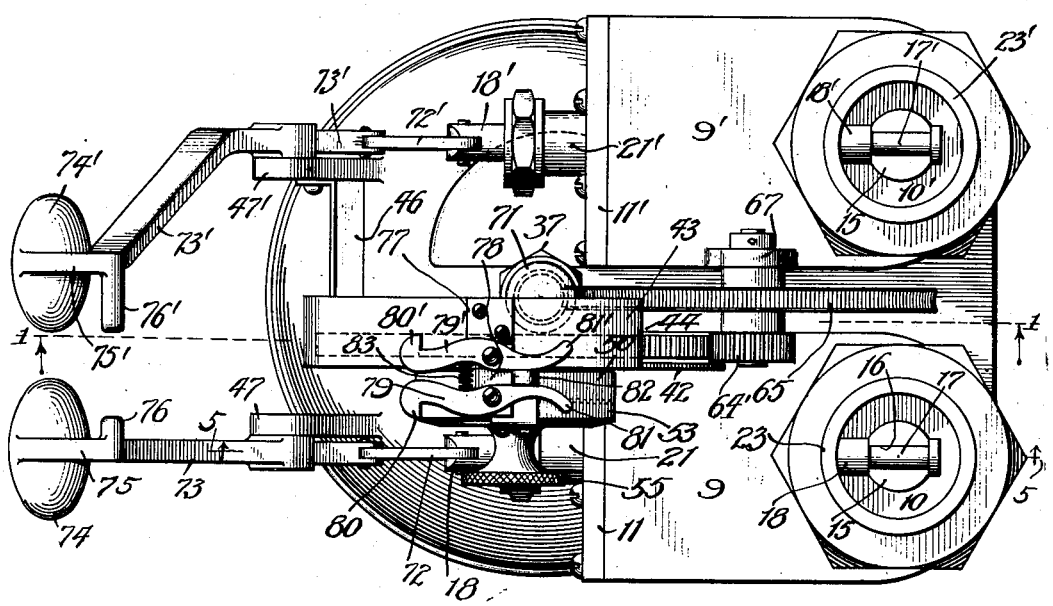
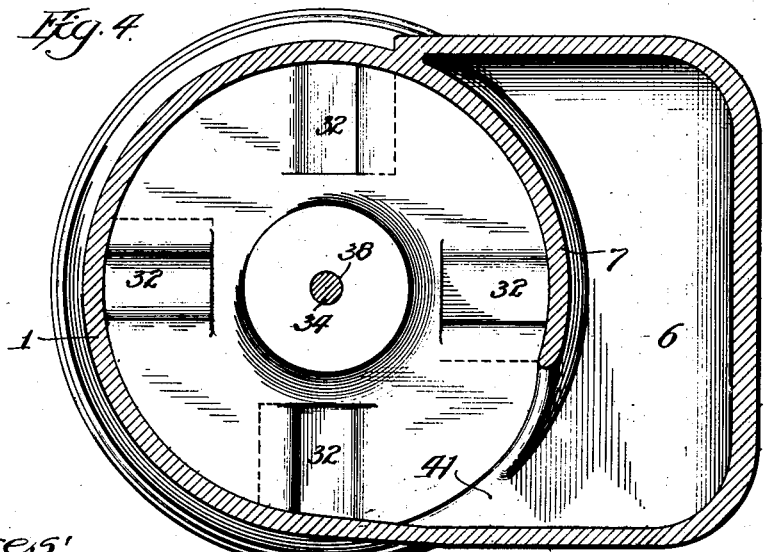

A. L. HANSEN.
FLUID METER.
APPLICATION FILED JUNE 2, 1910.
998,089.
Patented July 18, 1911.
4 SHEETS—SHEET 4.
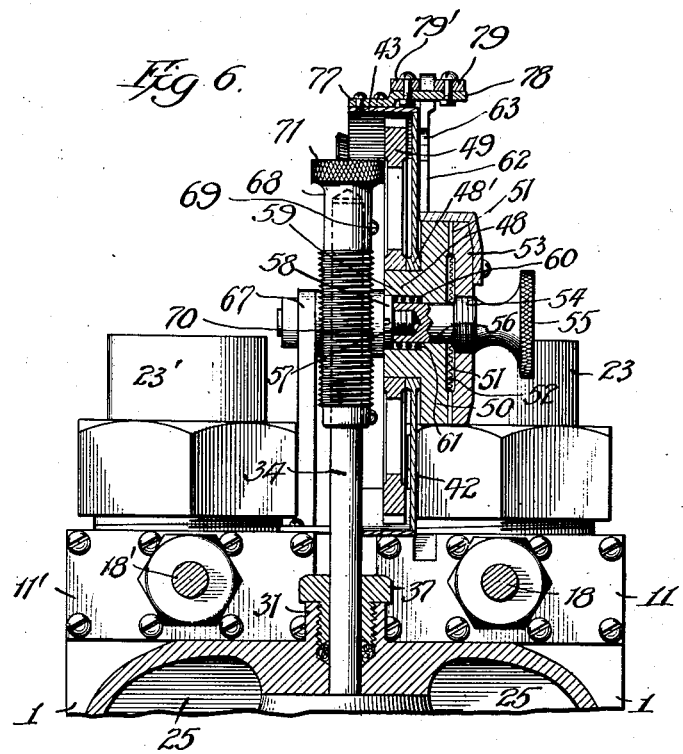
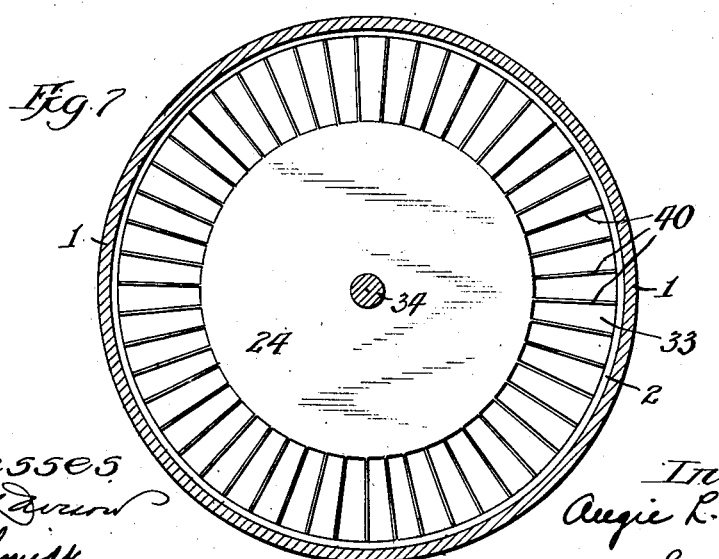

UNITED STATES PATENT OFFICE.

AUGIE L. HANSEN, OF CHICAGO, ILLINOIS.

FLUID-METER.

998,089.  Specification of Letters Patent.  Patented July 18, 1911.

Application filed June 2, 1910. Serial No. 564,555.

*To all whom it may concern:*

Be it known that I, AUGIE L. HANSEN, a resident of Chicago, in the county of Cook and State of Illinois, have invented certain new and useful Improvements in Fluid-Meters, of which the following is a clear, full, and precise specification.

My invention relates to fluid meters, particularly to water meters. Among the important objects of my invention are to provide a meter with a movable element whose operation is uniform, regular and accurate; to provide improved valve mechanism for controlling the flow of fluid to the movable element; to provide improved means automatically controlling the valve mechanism to stop the flow of fluid through the meter after the passage of a predetermined volume therethrough; to provide improved means for setting the meter for a desired volume of fluid; to provide for coöperation between the setting mechanism and the valve controlling mechanism to automatically adjust the valve mechanism to prevent further flow after passage of the volume for which the meter has been set; and in general to provide a simple, small, light and inexpensive meter which will accurately measure fluid flow and which can be set to be automatically shut off after a predetermined volume of fluid has passed therethrough.

One embodiment of the various features of my invention is clearly described in the following specification and illustrated in the accompanying drawings, in which drawings—

Figure 1 is a front elevation view of the meter, the lower part thereof being partly in vertical diametrical section, Fig. 2 is a front elevation view of the upper part of the meter showing a different position of the setting and valve adjusting mechanism, Fig. 3 is a plan view of the parts shown in Fig. 1, Fig. 4 is a sectional view taken on plane 4—4, Fig. 1, Fig. 5 is a sectional view taken on plane 5—5, Fig. 3, Fig. 6 is a sectional view taken on plane 6—6, Fig. 1, and Fig. 7 is a sectional view taken on plane 7—7, Fig. 1.

The supporting structure for the meter comprises upper and lower cup-shaped castings 1 and 2 having threaded connection 3 at their edges to form a globular chamber. The lower part 2 has an outlet 4 which may be threaded for suitable connection with piping or with a receptacle. Extending laterally from the part 1 near the top thereof is a wall 5 and below this wall extends another wall section 6, the walls 5 and 6 and the intermediate wall section 7 of the part 1 forming an intermediate compartment or passageway 8. Mounted on the wall 5 I have shown two rectangular structures 9 and 9' forming valve compartments 10 and 10', the front ends of these compartments being closed by heads 11 and 11'. The structures 9 and 9' together with the walls 5 and 6 are preferably cast integral with the upper body part 1, and the heads 11 and 11' are preferably separable and secured as by screws. As best shown in Figs. 3 and 5, each valve compartment communicates with the chamber 8 through a port 12 surrounded by a valve seat 13 with which coöperates a slide valve 14. Each valve is in the form of a disk and is provided with a central vertical stud 15 having a diametral slot 16 for receiving the necked end 17 of a valve stem 18, this connection of the stem with the valve allowing the valve to move freely and accurately over its seat. Each valve stem is encircled by a compression spring 19 abutting against the corresponding head 11 or 11' and against a pin 20 extending through the stem at the valve end, this spring tending to hold the valve in its innermost position to close the port 12 controlled thereby. Each head 11 and 11' carries a stuffing box extension 21 through which the stem extends. Each valve compartment over its outlet port 12 has an inlet extension 22 which by means of suitable coupling mechanism 23 may be connected with a fluid supply conductor or source.

Referring particularly to Figs. 1, 4 and 7, a partition 24 divides the body structure into upper and lower compartments 25 and 26, the partition being rigidly held in place by virtue of a flange 27 clamped between the upper edge 28 of the body part 2 and the shoulder 29 on the body part 1 when the two body parts are screw threaded together. The partition has also the upper extension or hub 30 which engages with the hub part 31 of the body part 1. Adjacent its periphery the partition has a number of nozzle passageways 32, and the partition acts as a nozzle plate for a vane wheel or disk 33 which is secured to a vertical spindle 34 pivoted at its lower end on pivot point 35 carried by a number of radial arms 36 extending from the part 2, the upper end of the spindle passing through stuffing box mechanism 37 formed in the hub 31, the spindle passing also freely through the central opening 38 through the partition or nozzle plate 24. The nozzle passageways extend diagonally through the nozzle plate, and the walls converge slightly so that the energy of fluid flowing therethrough has its velocity element increased. The vane wheel 33 has the radial vanes 40 inclined in a direction so that the fluid jets issuing from the nozzle passageways impinge upon the vanes to cause rotation of the vane wheel. The intermediate compartment 8 connects tangentially with the upper compartment 25 through a passageway 41, the area of this passageway and the aggregate area of the nozzle passageway being gaged in accordance with the areas of the inlet extensions 23. When the valves are open fluid flows through the valve compartments and into compartment 8 from whence it flows through the passageway 41 tangentially into compartment 25 above the nozzle plate and then through the nozzle passageways in the form of jets which impinge upon the vanes to drive the vane wheel, the water then flowing through the outlet 4 to the place where it is to be used. This vane or turbine driving arrangement will produce steady and uniform rotation of the spindle 34 and of measuring and indicating mechanism connected therewith.

The main support for the indicating and measuring mechanism is in the form of a disk 42 having a cylindrical flange 43 extending partway around its periphery to leave an entrance opening 44. As shown, the disk is held rigidly in place by brackets 45 and 46 extending respectively from the valve structure 9 and a vertical arm or lug 47 extending from the body part 1. The disk has a central hub 48' in which is journaled a hub 48 carrying at its inner end a gear wheel 49 and having at its outer end a flange 50 which with the gear wheel 49 serves to hold the hub 48 in place on the disk. In the outer face of the flange 50 along its periphery are provided clutch teeth 51 for coöperating with clutch teeth 52 on a disk 53. This disk is secured by threaded engagement with a stem 54 extending from a knurled head 55, the stem extending through the central opening 56 in the hub 48 and carrying at its end a screw 57 whose head 58 can reciprocate in the pocket 59 formed by enlarging the diameter of the opening 56, a spring 60 being disposed within said pocket and abutting against the head of the screw and the shoulder 61. By means of the knurled head 55 the stem 54 with disk 53 can be pulled outwardly to unclutch the disk from the flange 50 whereupon the disk can be rotated with reference to the flange to be again returned into coupling engagement with the flange by force of spring 59 upon release of the head. The disk 53 carries a radially extending indicating arm 62 whose beveled edge 63 travels over scale marks 64 provided on the front face of the disk 42, the scale marks being representative of volume of fluid flowing through the meter. The gear wheel 49 meshes with a pinion 64' secured concentrically to a worm wheel 65 which is pivoted on an arbor 66 supported at the upper end of a bracket 67 extending from the valve casing, the gear and worm wheel extending through the opening 44. A sleeve 68 receives the upper end of the vane wheel spindle 34 and is adjustable thereon by means of set screws 69. This sleeve has worm threads 70 engaging with the teeth on worm wheel 65, and the upper end of the sleeve has a knurled head 71 by means of which it may be adjusted. Rotation of the vane wheel is transmitted through the spindle to the worm sleeve and worm gear and to the indicating arm through the pinion 64, gear wheel 49, hub 48 and clutch members 50 and 53, the indicating arm traveling about the disk over the scale thereon to indicate at any time the volume of fluid which has passed through the meter.

The valve stem 18 has pivoted to its outer end a link 72 whose other end pivots to the lower end of a lever 73 pivoted at an intermediate point to the standard 47, the upper end of this lever terminating in a finger knob 74 from which extends an arm 75 having a catch end 76. Likewise, the valve stem 18' pivots to a link 72' which pivots to a lever 73' pivoted to standard 47' and terminating in a finger knob 74' having an arm 75' terminating in a catch extension 76'. At the top of the disk 42 and secured to the flange or rim 43 is a bracket 77 whose horizontal arm 78 pivots two latch levers 79 and 79' having the hooks or latch teeth 80 and 80' at one end, the other ends 81 and 81' flaring outwardly to receive between them the upper end 82 of the indicating arm 62, as best shown in Fig. 3. A compression spring 83 is interposed between the latch ends of the arms and tends to spread these ends apart. When the meter is not measuring the arms 73 and 73' are sprung to their outward position and the springs 19 hold the valve stems inwardly to allow the valves to close the inlet ports. The arrangement is such that when the indicating arm is in its upper position at the zero mark its end 82 is interposed between the tripping ends 81 and 81' of the latch levers so that the latch teeth 80 and 80' are out of the path of the catch extensions 76 and 76' of the levers. Where two valve mechanisms are provided, as shown, one may serve to control the flow of fluid at one temperature, and the other can serve to control the flow of fluid at another temperature, or the valve mechanisms can control the flow of different fluids. If it is desired to have a definite volume of fluid flow through the meter the adjusting head 55 is first pulled outwardly to disconnect the clutch members and is then rotated to carry the indicating arm to the scale mark indicating the volume to be measured. This rotation of the arm withdraws its end from the latch levers whose latch ends are then spread apart by spring 83 to carry the latch teeth 80 and 80' into the path of the levers. If flow is desired through only one of the valve mechanisms the corresponding lever is swung inwardly past the tooth of its latch lever, whereupon its catch extension will be engaged by the latch tooth and the lever locked in its inner position. If flow is desired through both valve mechanisms both levers are swung inwardly to be locked by the latch levers. This inward swing of the levers pulls out the valve stems to open the valves, and fluid immediately flows, its passage through the turbine compartments causing the vane wheel and its stem to rotate, this rotation being transmitted to the indicating arm, as before traced, and the direction of rotation of the indicating arm being back toward the zero point on the scale. As soon as the arm again reaches this point the desired volume of fluid will have been delivered through the meter and the end of the arm passes between the tripping ends of the latch levers to draw the latch teeth thereof away from the catch extensions on the valve controlling levers, the springs 19 and 19' then restoring the levers to their outer position and reclosing the valves. Thus, by first setting the indicating arm in accordance with the volume of flow desired and then actuating one or all of the valve levers the valves are opened and the meter started, and as soon as the volume for which the meter has been set has passed through the meter the valves will be automatically closed and the meter stopped with the indicating arm in its initial position. For example, if the divisions on the scale are indicative of gallons and it is desired to supply 15½ gallons of water, the indicating arm is set to the position shown in Fig. 2 to indicate 15½, and the valve controlling levers moved to their latched position, whereupon the fluid will flow and the indicating arm be rotated back to its zero position to trip the levers and to close the valves after 15½ gallons have passed through the meter. The levers could, of course, be actuated independently of each other and of the latch mechanism and be manually held in position to open the valves until the desired volumes have been delivered.

The turbine arrangement which I use in my meter gives a very powerful yet very uniform and steady drive for the indicating parts, and the movable element and the indicating mechanism connected therewith moves very rapidly, yet at the same time causing accurate registration. The automatic attachment to the meter enables the meter to be set for any volume and the flow is shut off and the meter stopped immediately after the volume adjusted for has been delivered by the meter. A definite quantity of fluid can be first delivered through one valve mechanism and then a quantity of fluid delivered through the other valve mechanism, or all valve mechanisms can be controlled simultaneously to admit fluid to the meter. The construction of the meter is also extremely simple and the various parts are readily accessible for adjustment or repair.

I do not desire to be limited to the precise arrangement and construction which I have shown and described, as modifications are possible which would still come within the scope of my invention, and I, therefore, desire to secure the following claims by Letters Patent:

1. In a fluid meter, the combination of a frame forming a passageway for fluid to be measured, a movable member disposed in said passageway to be driven by the fluid flowing therethrough, a stem extending from said movable member, a threaded sleeve mounted on the outer end of said stem and having worm threads, a driving gear, a transmission train connecting said worm threaded sleeve and driving gear to transmit rotation of the movable member to said driving gear, a plate secured to rotate with said driving gear, a disk adjacent said plate, a spring tending to lock said disk to said plate to rotate therewith, a dial concentric with said driving gear and said plate and disk, an indicating arm secured to said disk to travel over said dial upon rotation of said disk, means for disconnecting said disk from said plate against the force of said spring to allow said disk to be rotated independently of said plate and driving gear to set the indicating arm at any point of the dial and to be re-connected with said plate after such setting of the indicating arm whereby rotation of the driving gear upon rotation of the movable member causes said indicating arm to be returned to its initial position, valve mechanism for controlling the flow of fluid through said passageway, spring mechanism tending to close said valve mechanism, lever mechanism for causing opening of said valve mechanism against the force of said spring, latch mechanism for locking the lever in position to open said valve mechanism, and means whereby said latch mechanism is tripped to release the lever when said indicating arm reaches its normal position.

2. In a fluid meter, the combination of a frame forming a passageway for fluid to be measured, a movable member disposed in said passageway to be driven by fluid flowing therethrough, a spindle extending from said movable member, a sleeve secured to the outer end of said spindle and having worm threads, a worm wheel pivoted to mesh with said threads, a driving gear, transmission mechanism connecting said worm wheel with said driving gear, a plate concentric with and secured to rotate with said driving gear and having teeth on its front face, a disk concentric with said plate and having teeth for engaging with the teeth on said plate, spring mechanism carried by the plate and connected with the disk, said spring mechanism tending to lock the teeth of the disk and plate in meshing engagement, a dial concentric with said plate and disk, an indicating arm extending from said disk to coöperate with said dial and normally extending in zero position with reference to the disk, valve mechanism controlling the flow of fluid through said passageway, spring mechanism tending to hold said valve mechanism in closed position, lever mechanism connecting with said valve mechanism and adapted to be actuated to open said valve mechanism against the force of the spring mechanism, latch mechanism for receiving the lever mechanism and locking said lever mechanism in accurate position to hold the valve mechanism open, said latch mechanism being engaged by the indicating arm when in its normal position to prevent latching engagement thereof with the lever mechanism, and setting means whereby said disk may be pulled away from the plate against the force of its spring mechanism and whereby the disk can be rotated independently of the plate to carry the indicating arm away from the zero position, said plate spring mechanism causing reëngagement of the disk with the plate upon release of the setting mechanism, such setting movement of the indicating arm allowing the lever mechanism to be brought into latching engagement with the latch mechanism, rotation of the movable member causing rotation of the driving gear and disk connected therewith whereby said actuating arm is returned to normal position to reëngage with the latch mechanism to release the lever mechanism and to allow the valve mechanism to again close said passageway.

3. In a fluid meter, the combination of a frame forming a passageway for fluid to be measured, a movable member pivoted within said passageway to rotate in accordance with the volume of fluid flowing through said passageway, a spindle extending from said movable member, a dial, a combined indicating and trip arm pivoted to rotate about said dial, transmission mechanism connecting said indicating arm with said spindle, means for setting said indicating arm independently of rotation of said spindle to a point away from a zero point on said dial, two trip levers pivoted adjacent each other and having hooked latch ends at one side of their pivot point and tripping ends at the opposite sides of their pivot points, a spring between the latch ends of said levers tending to spread said levers apart and to bring the trip ends together, said indicating and tripping arm when in zero position engaging between the tripping ends of the tripping levers to bring the latch ends of said levers together and being disengaged from said tripping ends when set in a position away from the zero position, two inlets to said fluid passageway, a valve mechanism for each inlet, means tending to hold each valve mechanism in closed position, an actuating lever for each valve mechanism adapted upon actuation to open the valve mechanism, and a latch extension on each actuating lever adapted for latching engagement with the latch end of one of said tripping levers, when moved into position to open its valve mechanism, return of the indicating and tripping arm to zero position upon flow of fluid through the open inlets causing the latch ends of the tripping levers to be brought together to release the lever mechanisms whereby said inlets are again closed by the valve mechanisms.

4. In a fluid meter, the combination of an inclosing shell, a horizontal partition dividing the interior of said shell into upper and lower compartments, a pivot bearing, means whereby said pivot bearing is supported centrally in said lower compartment, a spindle journaled at its lower end on said pivot bearing and extending upwardly through said partition and through the upper wall of said shell, a turbine wheel secured to said spindle adjacent the under side of said partition and having turbine blades extending from its periphery, said partition having passageways acting as nozzles for directing fluid from the upper compartment to said turbine blades to cause rotation of the turbine wheel and spindle, an inlet to said upper compartment, an outlet from the lower compartment, a dial, an indicating arm associated with said dial, and transmission mechanism connecting said indicating arm with said spindle whereby said arm is actuated upon rotation of the turbine wheel to indicate on said dial the quantity of fluid passing through said turbine wheel.

5. In a fluid meter, the combination of upper and lower cup-shaped halves fitted together, a horizontal partition in the upper half, a bearing point supported centrally within said lower half, a vertical spindle pivoted at its lower end to said pivot point and extending upwardly through said partition and being journaled in the wall of said upper half, a turbine wheel within the lower half secured to the spindle to rotate adjacent the lower base of said partition, a fluid inlet to the space above said partition, a fluid outlet from the space below said turbine wheel, said partition having passageways forming nozzles for directing fluid to said turbine wheel to cause rotation thereof, and means controlled by the rotation of said spindle for indicating the volume of fluid flowing through said turbine wheel.

6. In a fluid meter, the combination of upper and lower cup-shaped frame halves having threaded connection at their peripheries, a horizontal partition within the upper half held in place therein by the engagement of said halves with each other, a pivot pin, means whereby said pivot pin is supported centrally in the lower half, a vertical spindle journaled in the upper frame half and extending downwardly through said partition and having pivotal connection at its lower end with said pivot point, a horizontal turbine wheel directly below said partition and secured to said spindle, a fluid inlet into the upper frame half above said partition, a fluid outlet from the lower frame half below said turbine wheel, said partition having passageways for directing fluid against said turbine wheel to cause rotation thereof, and means controlled by the rotation of said spindle for indicating the volume of fluid flowing through said turbine wheel and out of said outlet.

In witness hereof, I hereunto subscribe my name this 31st day of January, A. D., 1910.

AUGIE L. HANSEN.

Witnesses:
  CHARLES J. SCHMIDT,
  NELLIE B. DEARBORN.